No. 711,823. Patented Oct. 21, 1902.
F. CAVALLARO.
NUT LOCK.
(Application filed Mar. 17, 1902.)

(No Model.)

Witnesses,
E. J. Brandau
J. H. Howe

Inventor,
Francisco Cavallaro
By Dewey Strong & Co
Attys

UNITED STATES PATENT OFFICE.

FRANCISCO CAVALLARO, OF SAN JOSE, CALIFORNIA.

NUT-LOCK.

SPECIFICATION forming part of Letters Patent No. 711,823, dated October 21, 1902.

Application filed March 17, 1902. Serial No. 98,497. (No model.)

*To all whom it may concern:*

Be it known that I, FRANCISCO CAVALLARO, a citizen of the United States, residing at San Jose, county of Santa Clara, State of California, have invented an Improvement in Nut-Locks; and I hereby declare the following to be a full, clear, and exact description of the same.

My invention relates to a nut-locking device which is especially designed for securing fish-plates by which the meeting ends of railway-rails are united and in such a manner as to prevent the nuts jarring off by the pulsations of passing trains, and thus loosening the connection, while at the same time the device has sufficient play to allow the expansion and contraction.

It consists of the parts and the constructions and combinations of parts hereinafter described and claimed.

Figure 1:
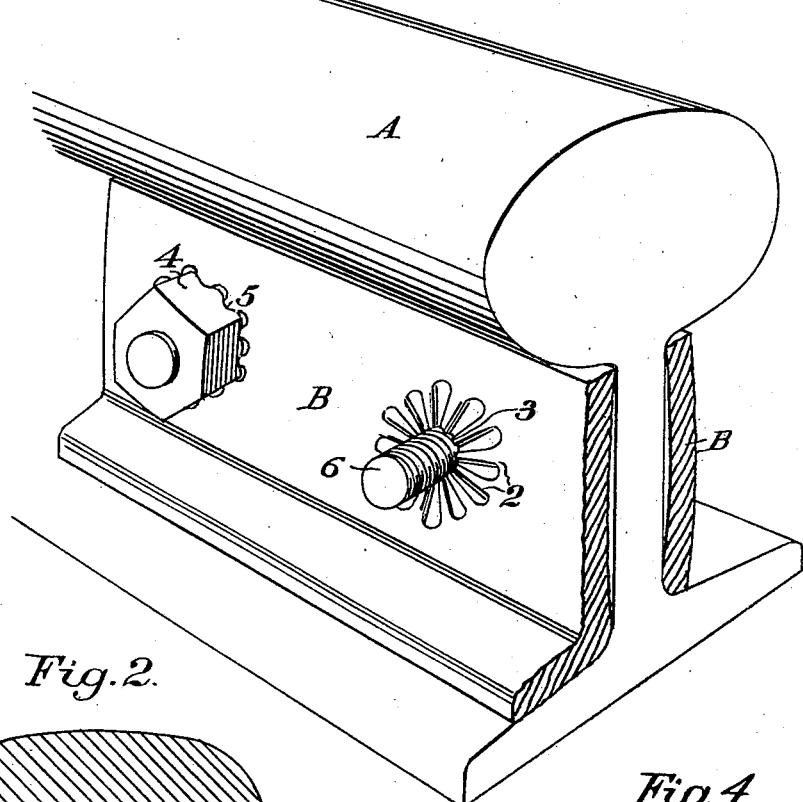
Figure 2:
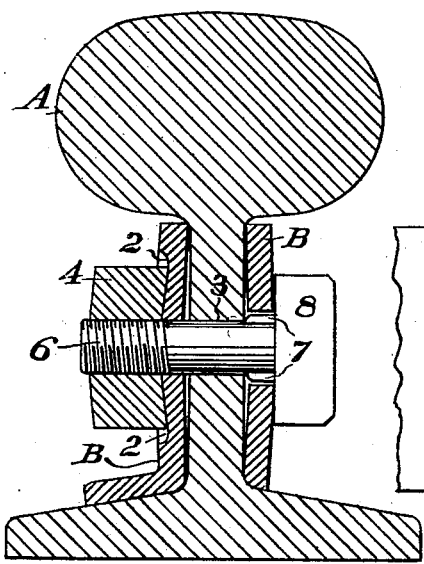
Figure 3:
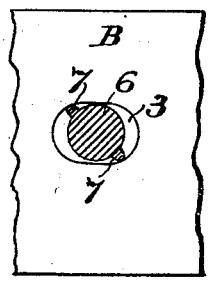
Figure 4:
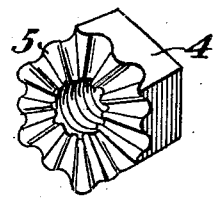
Figure 5:
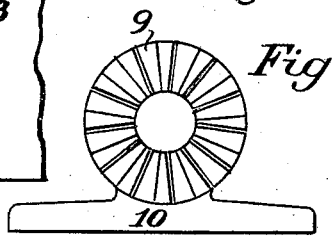

Referring to the accompanying drawings, Figure 1 is a perspective view of my nut-lock. Fig. 2 is a transverse section. Fig. 3 is a front view of a portion of a fish-plate, showing the bolt in section. Fig. 4 is a view of a nut. Fig. 5 is a front view of a washer.

A is a railway-rail, and B is a fish-plate, such as are employed to connect the rails by overlapping the joints where the rails meet upon each side of the vertical webs thereof, said fish-plates being bolted through the said webs. It is difficult to maintain these joints, because the constant pulsation and jar of passing trains causes the bolts or nuts to turn and become loosened.

It is the object of my invention to so lock the nuts upon the bolts and with relation to the fish-plates as to prevent this loosening.

The fish-plates B may be made either of cast-steel, and, if so made, the bolt-holes are usually formed at the same time by suitable cores in the molds, these bolt-holes being a little elongated in the direction of the length of the plate. If formed in this manner, the corrugations or indentations 2, which are formed in the plate, may be also thus cast, and thus the expense of forming the plate preparatory for my improvements is no greater than if the plate be formed plain. These corrugations are here shown as radial to bolt-holes 3 and may be preferably slightly divergent outwardly, with rounded ends, although this is not absolutely essential. If the plates are rolled and the holes afterward punched, the indentations 2 may be made at the same time that the holes are punched by a suitable die. The nuts 4 are made with similar corrugations on the end, as shown at 5, and these are adapted to engage with the corrugations 2 of the plate. When the plates and rails are in place, the bolts 6 are passed through the holes in the rails and plates and the nuts screwed onto the threaded end of the bolt on the opposite side from the heads. It will be understood that the fish-plates may either fit against the vertical webs of the rails, with their lower edges resting against the divergent base-flanges of the rails, or the fish-plates may be turned at the bottom and extend outwardly, resting upon the rail-flanges, either form being adapted to the use of my invention. The vertical portion of the fish-plate is slightly concaved on the side next the web of the rail, leaving the upper and lower parts contacting with the web, and the hole through the fish-plate being made through the concaved portion or about centrally between the top and bottom there will be a certain amount of spring to this portion of the fish-plate when the nut has been turned down so that its elevations begin to come in contact with those of the corrugations on the fish-plate, so that when by the aid of the wrench the nut is turned to cause these corrugations to pass each other the slight spring in the fish-plate will be sufficient to allow them to pass without cutting each other away, and the return of the fish-plate to its normal position when the corrugations of one coincide with the depressions of the other will prevent their turning backward in passing. In addition to this the bolt is further tightened in the nut as follows: The bolts used for this class of work are formed with oppositely-projecting lugs 7 just beneath the head 8, and as the hole 3, through which the bolt passes, is slightly elongated it will be seen that these lugs, which pass through the hole in the direction of its length, will when the nut is turned be forced around with the bolt until the contact with the shorter diameter of the hole 3, and this prevents the bolt from being turned while the nut is being screwed down. After the nut has been turned to pass one or two of the corrugations of the fish-plate and to be engaged therewith, as previously described, any jar upon the bolt will cause it to turn in the opposite direction—that is, so that the lugs 7, which have been turned as far as possible in one direction within the hole 3, may be turned in the opposite direction until they contact with the opposite sides of the hole, as shown in Fig. 3. This turn advances the screw-threads of the bolt into the nut, and thus draws the nut a little closer into the corrugations of the fish-plate. This result can be attained immediately by striking one or two blows of the hammer upon the head of the bolt after the nut has been seated by the wrench, and these blows will cause the bolt to turn backwardly, and thus become as tight as is desirable with relation to the rail and fish-plates. The elongation of the slots in the plates is sufficient to allow for the usual expansion and contraction of the rails by heat and cold.

When the old style of smooth fish-plate is used and it is found desirable to use washers between the nuts and the fish-plates, the washers are made as shown at 9, having corrugations upon one side only, and the corrugations upon this side engage with those upon the nut, so that when the nut is turned down the smooth surface of the washer will contact with the flat surface of the fish-plate and the nut will engage the corrugations on the outer face of the washer. When the washer is thus employed, it is prevented from turning by means of an extension 10 upon one side, this extension having a base of considerable length which is adapted to rest upon the rail-flange or upon the outwardly-projecting flange of the fish-plate, if such a one is made.

Having thus described my invention, what I claim, and desire to secure by Letters Patent, is—

1. The combination in a nut-lock of plates having bolt-holes, and one of said plates having corrugations or indentations radiating outwardly from the bolt-hole, corresponding corrugations formed upon the end of the nut and adapted to engage the corrugations of the plate when the nut is screwed on, and a bolt passing through the holes and having lugs formed beneath the head acting as stops to limit the turning of the bolt within its holes.

2. The combination in a nut-lock of elastic plates slightly concaved in cross-section and having holes made therethrough, one of said plates having radial corrugations formed upon the outer face around the hole, a bolt passing through the parts to be secured and having lugs formed beneath the head to act as stops for limiting the axial movement of the bolt within its holes, and a nut adapted to screw upon said bolt and having corrugations to engage and interlock with those in the plate, substantially as herein described.

3. A nut-lock consisting of plates fitting upon opposite sides of the parts to be secured having elongated holes made through them, corrugations radiating from said holes, bolts having lugs formed beneath the heads acting as stops to limit the turning of the bolt within the holes, nuts adapted to screw upon the threaded opposite ends of the bolts, and having the inner ends corrugated to engage the corrugations upon the plate, the bolt being also turnable backwardly until the lugs contact with the opposite sides of the opening whereby the nut will be drawn farther upon the bolt.

4. The combination in a nut-lock of plates having bolt-holes made therethrough and adapted to clamp the parts to be secured, corrugations formed radially about the bolt-holes, bolts passing through said holes having heads upon one end, said bolts having lugs formed beneath the heads and to engage the bolt-holes to limit the turning of the bolt, and screw-threads upon the opposite ends, nuts fitting said screw-threads having the inner ends corrugated and washers interposed between the nuts and the plates, said washers having one surface corrugated to engage the nut-corrugations, and an extension upon one side of the washer.

In witness whereof I have hereunto set my hand.

FRANCISCO CAVALLARO.

Witnesses:
I. L. KOPPEL,
C. M. LORIGAN,
B. G. TAYLOR.